US010541933B2

(12) United States Patent
Strein et al.

(10) Patent No.: US 10,541,933 B2
(45) Date of Patent: Jan. 21, 2020

(54) SYSTEMS AND METHODS FOR ALIGNING FRAMES OF A DIGITAL VIDEO CONTENT IN IP DOMAIN

(71) Applicant: Disney Enterprises, Inc., Burbank, CA (US)

(72) Inventors: Michael J. Strein, Bohemia, NY (US); Vladislav Feldman, Manhasset Hills, NY (US); Craig Beardsley, Chicago, IL (US)

(73) Assignee: Disney Enterprises, Inc., Burbank, CA (US)

( * ) Notice: Subject to any disclaimer, the term of this patent is extended or adjusted under 35 U.S.C. 154(b) by 357 days.

(21) Appl. No.: 15/348,882

(22) Filed: Nov. 10, 2016

(65) Prior Publication Data

US 2018/0131845 A1    May 10, 2018

(51) Int. Cl.
| | |
|---|---|
| *H04N 21/43* | (2011.01) |
| *H04N 21/643* | (2011.01) |
| *H04N 21/845* | (2011.01) |
| *H04L 12/873* | (2013.01) |
| *H04N 21/44* | (2011.01) |
| *H04J 3/06* | (2006.01) |

(52) U.S. Cl.
CPC ....... *H04L 47/522* (2013.01); *H04N 21/4302* (2013.01); *H04N 21/44004* (2013.01); *H04N 21/64322* (2013.01); *H04N 21/8458* (2013.01); *H04J 3/0667* (2013.01)

(58) Field of Classification Search
CPC ....................................................... H04N 5/04
See application file for complete search history.

(56) References Cited

U.S. PATENT DOCUMENTS

| | | | | |
|---|---|---|---|---|
| 6,661,846 B1 * | 12/2003 | Ota | ............ | H03L 7/16 348/537 |
| 6,879,581 B1 * | 4/2005 | Leung | ............... | H04L 29/06027 370/352 |
| 7,349,428 B2 * | 3/2008 | Hulmani | ............. | H04N 21/236 370/466 |
| 7,483,421 B2 * | 1/2009 | Compton | ................ | H04L 45/00 370/352 |
| 7,764,713 B2 * | 7/2010 | Abraham | ............. | H04N 21/235 370/503 |
| 7,788,568 B1 * | 8/2010 | Huang | .................. | H03M 13/01 709/224 |

(Continued)

*Primary Examiner* — Brian P Yenke
(74) *Attorney, Agent, or Firm* — Farjami & Farjami LLP

(57) ABSTRACT

There is provided a system including a non-transitory memory storing an executable code, and a hardware processor configured to execute the executable code to receive first and second Internet protocol (IP) video packets including respective first and second video content, and to identify a common reference time for the first and second IP video packets. The hardware processor also determines a first buffering interval for synchronizing the first and second IP video packets based on a first frame number, a first line number, and a first pixel number of the first video content, and the common reference time. In addition, the hardware processor holds the first IP video packet during the first buffering interval, and releases the first IP video packet when the first buffering interval elapses so as to align the first video content with the second video content at the common reference time.

18 Claims, 3 Drawing Sheets

(56) References Cited

U.S. PATENT DOCUMENTS

| | | | | |
|---|---|---|---|---|
| 8,077,707 B2* | 12/2011 | Isnardi | H04L 47/10 | |
| | | | 370/389 | |
| 8,094,556 B2* | 1/2012 | Michaelis | H04L 45/24 | |
| | | | 370/230.1 | |
| 8,379,151 B2* | 2/2013 | Shenoi | H04J 3/0632 | |
| | | | 348/512 | |
| 8,416,786 B2* | 4/2013 | Li | H04N 21/236 | |
| | | | 370/395.5 | |
| 8,427,577 B2* | 4/2013 | Aust | H04N 21/2343 | |
| | | | 348/448 | |
| 8,681,854 B2* | 3/2014 | Leprovost | H04N 21/234327 | |
| | | | 375/240 | |
| 8,970,750 B2* | 3/2015 | Sugioka | G06T 1/0007 | |
| | | | 348/294 | |
| 8,989,006 B2* | 3/2015 | Jost | H04N 21/23439 | |
| | | | 370/235 | |
| 9,432,708 B1* | 8/2016 | Feldman | H04N 21/242 | |
| 9,794,143 B1* | 10/2017 | Chari | H04L 43/08 | |
| 2004/0255329 A1* | 12/2004 | Compton | H04N 21/234327 | |
| | | | 725/109 | |
| 2008/0084899 A1* | 4/2008 | Potenzone | H04J 3/0632 | |
| | | | 370/509 | |
| 2008/0137538 A1* | 6/2008 | Stephan | H04L 41/142 | |
| | | | 370/241 | |
| 2008/0137691 A1* | 6/2008 | Barry | H04J 3/0632 | |
| | | | 370/503 | |
| 2008/0288663 A1* | 11/2008 | Kovacevic | H04N 21/434 | |
| | | | 710/5 | |
| 2009/0144361 A1* | 6/2009 | Nobakht | G06Q 30/02 | |
| | | | 709/203 | |
| 2010/0034256 A1* | 2/2010 | Bennett | H04N 7/24 | |
| | | | 375/240.01 | |
| 2011/0252265 A1* | 10/2011 | Iwami | H04N 19/645 | |
| | | | 713/401 | |
| 2012/0281715 A1* | 11/2012 | Shojania | H04L 12/2671 | |
| | | | 370/468 | |
| 2013/0016282 A1* | 1/2013 | Kim | H04N 21/242 | |
| | | | 348/521 | |
| 2013/0198292 A1* | 8/2013 | Aaltonen | H04W 56/00 | |
| | | | 709/205 | |
| 2013/0265445 A1* | 10/2013 | Argyropoulos | H04N 21/44209 | |
| | | | 348/192 | |
| 2015/0163532 A1* | 6/2015 | Shmueli | H04N 21/23418 | |
| | | | 386/326 | |
| 2015/0181309 A1* | 6/2015 | Shepherd | H04L 12/18 | |
| | | | 725/109 | |
| 2015/0271242 A1* | 9/2015 | Jiang | H04L 65/80 | |
| | | | 709/231 | |
| 2015/0281038 A1* | 10/2015 | Kloeden | H04J 3/0658 | |
| | | | 370/252 | |
| 2016/0080288 A1* | 3/2016 | Meyer | H04L 45/66 | |
| | | | 370/352 | |
| 2016/0277473 A1* | 9/2016 | Botsford | H04L 65/608 | |
| 2016/0345043 A1* | 11/2016 | Feldman | H04N 21/26241 | |
| 2017/0208220 A1* | 7/2017 | Stankoski | H04N 5/0736 | |

* cited by examiner

SYSTEMS AND METHODS FOR ALIGNING FRAMES OF A DIGITAL VIDEO CONTENT IN IP DOMAIN

BACKGROUND

When displaying a video content, it is axiomatic that each frame of a video signal must appear in the intended position on the video display. Inconsistent positioning of subsequent frames of the video content causes the image to appear blurry and may affect the color of the video content on a display. Additionally, subsequent frames of a video content must appear in sequential order and at a consistent and appropriate frame rate. Conventionally, reference points have been used to align video frames on the display, and video effects, such as a black burst, have been used to synchronize videos in time. Recent advances in video technology allow digital video contents to be transmitted using Internet protocol (IP), which introduces new challenges for alignment of video frames.

SUMMARY

The present disclosure is directed to systems and methods for aligning frames of digital video content in an Internet Protocol (IP) domain, substantially as shown in and/or described in connection with at least one of the figures, as set forth more completely in the claims.

DETAILED DESCRIPTION

Figure 1:
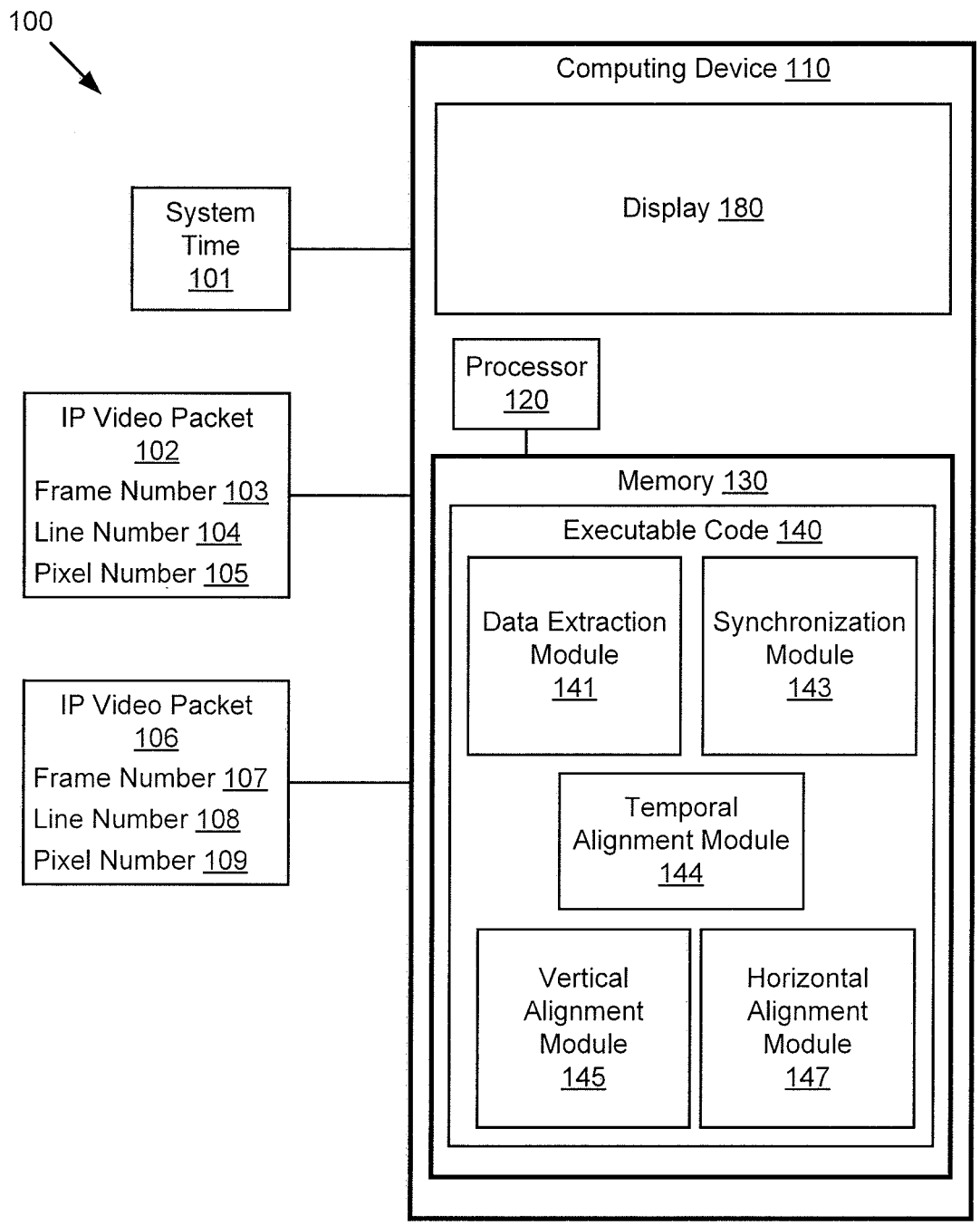
FIG. 1 shows a diagram of an exemplary system for aligning frames of digital video content in an Internet Protocol (IP) domain, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary system for aligning frames of digital video content in an Internet Protocol (IP) domain, according to one implementation of the present disclosure. System 100 includes system time 101, first IP video packet 102, second IP video packet 106, and computing device 110. System time 101 may be a synchronization time for synchronizing a plurality of devices in system 100. In some implementations, system time 101 may be an internal time generated by computing device 110. In other implementations, system time 101 may be a Precision Time Protocol (PTP) time generated by a master device (not shown in FIG. 1) or grandmaster device (also not shown in FIG. 1). System time 101 may be a common reference time and may be used to synchronize devices and/or events in system 100.

First IP video packet 102 and second IP video packet 106 may be respective IP packets each including part or all of a frame, line, or pixel of digital video content. In some implementations the frame, line, and pixel structures may extend over frame boundaries. For example, 4K content (e.g. 3840×2160 line/pixel structure) at 120 frames per second will contain a tremendous amount of information as contrasted to a 480P (e.g. 480×720 line/pixel structure) at 24 frames per second. The example used is intended to show a generic sample of a frame/line/pixel structure. However, the inventive principles disclosed in the present application are applicable to substantially all types of formats.

As shown in FIG. 1, first IP video packet 102 includes frame number 103, line number 104, and pixel number 105. For example, frame number 103, line number 104, and pixel number 105 may be included in a header of a frame of first IP video packet 102. Frame number 103 may indicate a frame number of the video content that is included in first IP video packet 102. In some implementations, frame number 103 may indicate a frame of the video content in reference to system time 101, which may be a common reference time for first IP video packet 102 and second IP video packet 106, for example. Line number 104 may indicate a line of frame number 103, and may correspond to the common reference time. Pixel number 105 may indicate a pixel of line number 104, and may correspond to the common reference time. In some implementations, the common reference time may be a time when first IP video packet 102 is received by executable code 140.

As shown further shown in FIG. 1, second IP video packet 106 includes frame number 107, line number 108, and pixel number 109. For example, frame number 107, line number 108, and pixel number 109 may be included in a header of a frame of second IP video packet 106. Frame number 107 may indicate a frame number of the video content that is included in second IP video packet 106. In some implementations, frame number 107 may indicate a frame of the video content at a certain point in time, which may be measured by the common reference time, e.g., system time 101. Line number 108 may indicate a line of frame number 107, and may correspond to the common reference time. Pixel number 109 may indicate a pixel of line number 108, and may correspond to the common reference time. In some implementations, the common reference time may be a time when second IP video packet 106 is received by executable code 140.

Computing device 110 may be an IP video device for displaying an IP video, such as an IP television, a laptop or desktop computer, a tablet computer, a mobile device, to name a few examples. Alternatively, computing device 110 may be a smart IP routing device, such as a data router or switch, for example. Computing device 110 includes processor 120, memory 130, and display 180. Processor 120 is a hardware processor, such as a central processing unit (CPU) found in computing devices. Memory 130 is a non-transitory storage device for storing software for execution by processor 120, and also for storing various data and parameters. Memory 130 includes executable code 140. Executable code 140 may include one or more software modules for execution by processor 120. As shown in FIG. 1, executable code 140 includes data extraction module 141, synchronization module 143, temporal alignment module 144, vertical alignment module 145, and horizontal alignment module 147.

Data extraction module 141 is a software module stored in memory 130 for execution by processor 120 to extract data from IP video packets, such as first IP video packet 102 and/or second IP video packet 106. In some implementations, data extraction module 141 may extract data related to a video content included in first IP video packet 102 and/or second IP video packet 106. For example, when executable code 140 receives first IP video packet 102, data extraction module 141 may extract data such as frame number 103, line number 104, and/or pixel number 105. In some implementations, data extraction module 141 may extract the data with respect to a common reference time, which may be system time 101, or may be the time at which first IP video packet 102 is received, or may be a time that another IP video packet, such as second IP video packet 106, is received.

Synchronization module 143 is a software module stored in memory 130 for execution by processor 120 to synchronize two or more IP video packets, such as first IP video packet 102 and second IP video packet 106. In some implementations, synchronization module 143 may synchronize three or more IP video packets. Synchronization module operates to ensure that first IP video packet 102 and second IP video packet 106 are referenced to a common reference time, such as system time 101, for example. In addition, in some implementations, synchronizing first IP video packet 102 with second IP video packet 106 may include utilizing temporal alignment module 144, vertical alignment module 145, and horizontal alignment module 147, as described below.

Temporal alignment module 144 is a software module stored in memory 130 for execution by processor 120 to temporally align the video content of various IP video packets. In some implementations, temporal alignment module 144 may receive frame number 103 from data extraction module when executable code 140 receives first IP video packet 102, and/or frame number 107 from data extraction module 141 when executable code 140 receives second IP video packet 106. Temporal alignment module may align first IP video packet 102 and second IP video packet 106 based on the frame number corresponding to each IP video packet received and the common reference time, such as system time 101.

Vertical alignment module 145 is a software module stored in memory 130 for execution by processor 120 to vertically align the video contents of various IP video packets. In some implementations, vertical alignment module 145 may receive line number 104 from data extraction module 141 when executable code 140 receives first IP video packet 102, and/or line number 108 from data extraction module 141 when executable code 140 receives second IP video packet 106. Vertical alignment module 145 may vertically align first IP video packet 102 and second IP video packet 106 based on the line number corresponding to each IP video packet received and the common reference time.

Horizontal alignment module 147 is a software module stored in memory 130 for execution by processor 120 to horizontally align the video contents of various IP video packets. In some implementations, horizontal alignment module 147 may receive pixel number 105 from data extraction module 141 when executable code 140 receives first IP video packet 102, and/or pixel number 109 from data extraction module 141 when executable code 140 receives second IP video packet 106. Horizontal alignment module 147 may horizontally align first IP video packet 102 and second IP video packet 106 based on the pixel number corresponding to each IP video packet received and the common reference time.

Figure 2:
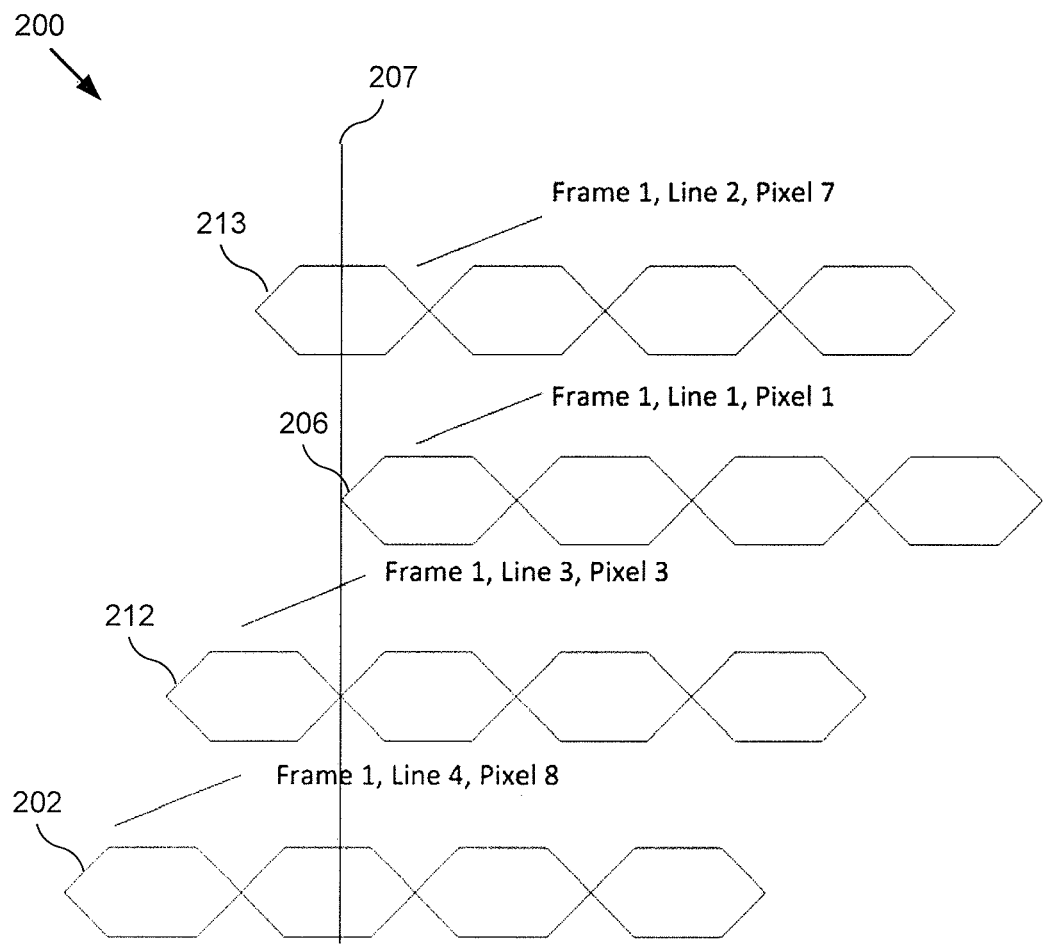
FIG. 2 shows a diagram of incoming digital video contents for use with the system of FIG. 1, according to one implementation of the present disclosure.

FIG. 2 shows a diagram of incoming digital video content for use with the system of FIG. 1, according to one implementation of the present disclosure. Diagram 200 shows video content 202, video content 212, video content 213, and video content 206 relative to common reference time 207. In some implementations, common reference time 207 may be defined by system time 101 and may assign time t=0 to the time a last IP video packet is received. As shown in FIG. 2, video content 206 is the last video content to be received in second IP video packet 106 at time 207. In some implementations, synchronization module 143 may use common reference tune 207 for synchronizing video content 202, 212, 213, and 206.

It is noted that video content 202 corresponds to the video content included in first IP video packet 102, in FIG. 1, while video content 206 corresponds to the video content included in second IP video packet 106. It is further noted that video content 202, video content 212, video content 213, and video content 206 may include completely encapsulated video content, or video essence encapsulated content. In other words, the systems and methods disclosed in the present application may be used with a wide variety of IP video standard methods. Examples of those standard methods include complete video encapsulation, such as Society of Motion Picture and Television Engineers (SMPTE) 2022, video essence encapsulation, such as SMPTE 2110, and Internet Engineering Taskforce (IETF) standards, such as RFC 3550.

Video content 202 is three (3) lines and seven (7) pixels ahead of video content 206. In some implementations, synchronization module 143 may hold video content 202 during a buffering interval lasting from the time video source 292 is received until common reference time 207. Video content 212 is two (2) lines and two (2) pixels ahead of video content 206. Synchronization module 143 may hold video content 212 during another buffering interval from the time video content 212 is received until common reference time 207. Video content 213 is one (1) line and six (6) pixels ahead of video content 206. Synchronization module 143 may hold video content 213 during yet another buffering interval from the time video content 213 is received until common reference time 207.

In some implementations, synchronization module 143 may synchronize video sources 202, 212, 213, and 206 based on the time the first video source is received or based on the time the last video source is received. In some implementations, the common reference time may be determined using system time 101, and the time a video source is received may be determined by the time at which a particular frame of a video content is received by synchronization module 143.

Figure 3:
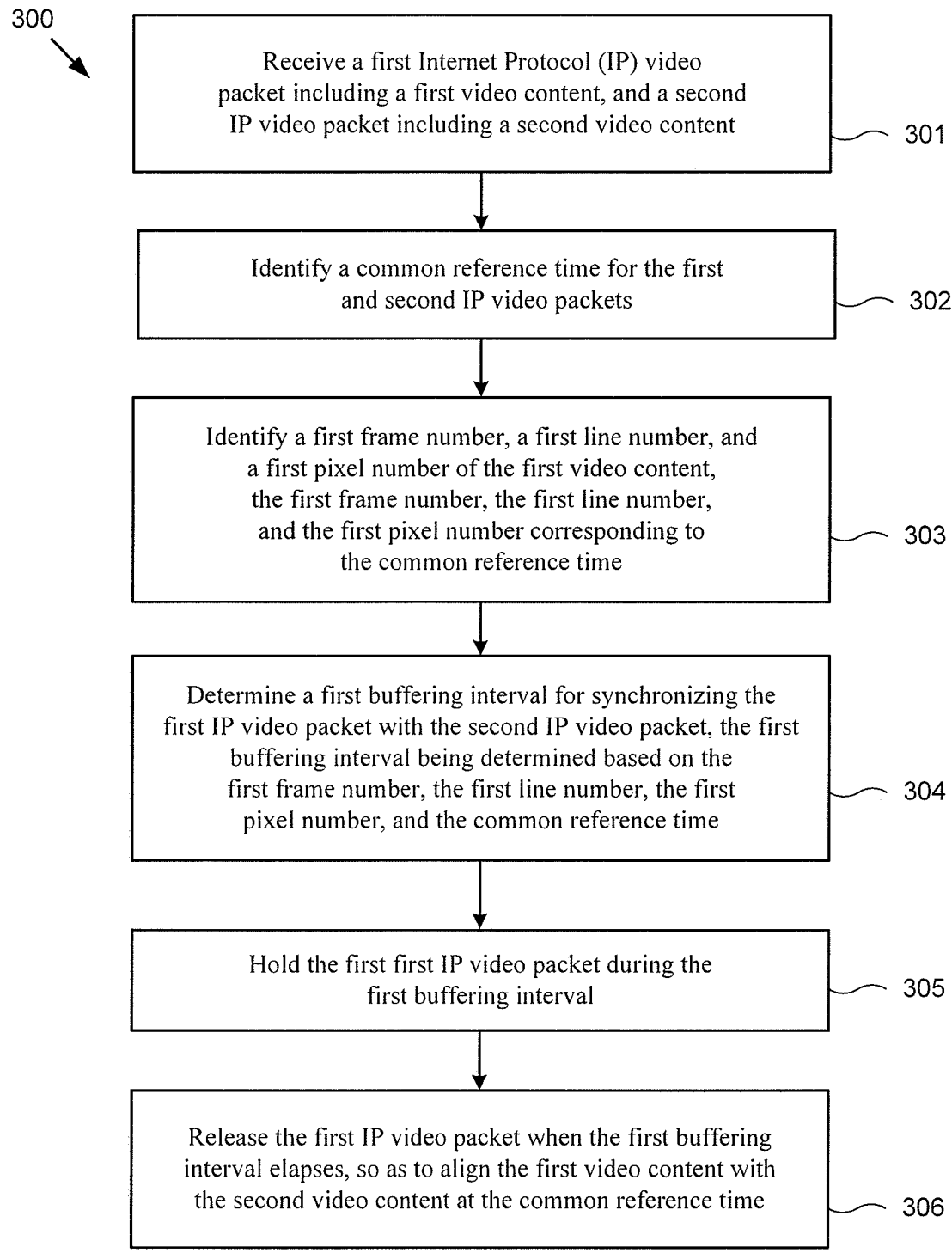
FIG. 3 shows a flowchart illustrating an exemplary method of aligning frames of digital video content in an IP domain, according to one implementation of the present disclosure.

FIG. 3 shows a flowchart illustrating an exemplary method of aligning frames of a digital video content in an IP domain, according to one implementation of the present disclosure. Method 300 begins at 301, where executable code 140, executed by hardware processor 120, receives first IP video packet 102 including video content 202 and second IP video packet 106 including video content 206. As shown in FIGS. 1 and 2, first IP video packet 102 includes video content 202 having frame number 103, line number 104, and pixel number 105. In addition, and as further shown in FIG. 1, second IP video packet 106 includes video content 206 having frame number 107, line number 108, and pixel number 109.

At 302, executable code 140, executed by hardware processor 120, identifies a common reference time for first IP video packet 102 and second IP video packet 106. In some implementations, the common reference time identified by executable code 140 may be system time 101, which may itself be a Precision PTP time used by system 100. However, in other implementations, the common reference time may correspond to time 207, in FIG. 2, which is the time that the last of multiple IP video packets 102/202, 212, 213, and 106/206 is received, i.e., the time that second IP video packet 102 is received.

At 303, executable code 140, executed by hardware processor 120, identifies frame number 103, line number 104, and pixel number 105 of video content 202 included in first IP video packet 102, where frame number 103, line number 104, and pixel number 105 correspond to the common reference time. Frame number 103 may indicate a frame number of video content 202 included in first IP video packet 102, line number 104 may indicate a line number of the frame included in first IP video packet 102, and pixel number 105 may indicate a pixel number in the first line. As a specific example, and referring to FIG. 2, where time 207 is identified as the common reference time, frame number 103, line number 104, pixel number 105 identify a frame-line-pixel position within video content 202 at common reference time 207, i.e., Frame 1, Line 4, and Pixel 8.

In some implementations, frame number 103 may be used as a reference to temporally align video content 202 included in first IP video packet 102 with video content 206 included in second IP video packet 106. Line number 104 may be used as a reference to vertically align video content 202 with video content 206. Pixel number 105 may be used as a reference position to horizontally align video content 202 with video content 206. Data extraction module 141 may extract frame number 103, line number 104, and/or pixel number 105 from first IP video packet 102.

At 304, executable code 140, executed by hardware processor 120, determines a first buffering interval for synchronizing first IP video packet 102 with second IP video packet 106, the first buffering interval being determined based on frame number 103, line number 104, and pixel number 106 of first IP video packet 102, and the common reference time. For example, and continuing with the exemplary use case shown in FIG. 2, where time 207 is identified as the common reference time, the buffering interval may be determined based on the extent to which video content 202 included in first IP video packet 102 leads common reference time 207. That is to say, the buffering interval may be determined based on the 3 lines and 7 pixels by which video content 202 leads common reference time 207.

At 305, executable code 140, executed by hardware processor 120, holds first IP video packet 102 during the buffering interval. For example, executable code 140 may hold first IP video packet 102 until one or more later arriving IP video packets, such as second IP video packet 106, are received. First IP video packet 102 may be held in memory 130, or in another memory (not shown in FIG. 1), such as a random access memory (RAM), of computing device 110.

At 306, executable code 140, executed by hardware processor 120, releases first IP video packet 102 when the first buffering interval elapses so as to align video content 202 with video content 206 at the common reference time, e.g., time 207. The method outlined in flowchart 300 advantageously results in video content 202 included in first IP video packet 102 being released in phase, i.e., pixel-to-pixel locked, with video content 206 included in second IP video packet 106.

Although not included in exemplary flowchart 300, in implementations in which the common reference time for first IP video packet 102 and second IP video packet 106 is a time other than the time at which second IP video packet 106 is received, such as a PTP time, the present method may further include additional actions analogous to actions 303, 304, 305, and 306 described above. For example, in those implementations, the present method may include determining a second buffering interval for synchronizing second IP video packet 106 with first IP video packet 102 based on frame number 107, line number 108, and pixel number 109 of second IP video packet 106. In addition, the present method may include holding second IP video packet 106 during the second buffering interval, and releasing second IP video packet 106 when the second buffering interval elapses, concurrently with releasing first IP video packet 102.

It is noted that, for some applications, it may be advantageous or desirable to manually adjust the line, pixel, and frame timing, with or without timing references, rather than have that adjustment performed automatically, as described above. Examples of such applications are those in which video content is to be aligned with either upstream or downstream devices that may have fixed timing implementations.

From the above description, it is manifest that various techniques can be used for implementing the concepts described in the present application without departing from the scope of those concepts. Moreover, while the concepts have been described with specific reference to certain implementations, a person having ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A system comprising:
   a non-transitory memory storing an executable code;
   a hardware processor executing the executable code to:
   receive a first Internet protocol (IP) video packet including a first video content, and a second IP video packet including a second video content;
   identify a common reference time for the first and second IP video packets;
   identify a first frame number, a first line number, and a first pixel number of the first video content, the first frame number, the first line number, and the first pixel number corresponding to the common reference time;
   determine a first buffering interval for synchronizing the first IP video packet with the second IP video packet, the first buffering interval being determined based on the first frame number, the first line number, the first pixel number, and the common reference time;
   hold the first IP video packet during the first buffering interval; and
   release the first IP video packet when the first buffering interval elapses so as to align the first video content with the second video content at the common reference time;
   wherein the common reference time is one of a first time the first IP video packet is received and a second time the second IP video packet is received.

2. The system of claim 1, wherein synchronizing the first IP video packet with the second IP video packet includes temporally aligning the first video content with the second video content based on the first frame number of the first video content and a second frame number of the second video content.

3. The system of claim 1, wherein synchronizing the first IP video packet with the second IP video packet includes vertically aligning the first video content with the second video content based on the first line number of the first video content and a second line number of the second video content.

4. The system of claim 1, wherein synchronizing the first IP video packet with the second IP video packet includes horizontally aligning the first video content with the second video content based on the first pixel number of the first video content and a second pixel number of the second video content.

5. The system of claim 1, wherein the hardware processor further executes the executable code to determine a second buffering interval for synchronizing the second IP video packet with the first IP video packet, the second buffering interval being determined based on a second frame number of the second IP video packet, a second line number of the second IP video packet, a second pixel number of the second IP video packet, and the common reference time.

6. The system of claim 5, wherein the hardware processor further executes the executable code to hold the second IP video packet during the second buffering interval.

7. The system of claim 6, wherein the hardware processor further executes the executable code to release the second IP video packet when the second buffering interval elapses.

8. The system of claim 1, wherein the first frame number, the first line number, and the first pixel number are included in a header of a first frame of the first IP video packet, and a second frame number, a second line number, and a second pixel number are included in a header of a second frame of the second IP video packet.

9. The system of claim 1, wherein the common reference time is the second time the second IP video packet is received.

10. A method for use with a device including a non-transitory memory and a hardware processor, the method comprising:
receiving, using the hardware processor, a first Internet protocol (IP) video packet including a first video content, and a second IP video packet including a second video content;
identifying, using the hardware processor, a common reference time for the first and second IP video packets;
identifying, using the hardware processor, a first frame number, a first line number, and a first pixel number of the first video content, the first frame number, the first line number, and the first pixel number corresponding to the common reference time;
determining, using the hardware processor, a first buffering interval for synchronizing the first IP video packet with the second IP video packet, the first buffering interval being determined based on the first frame number, the first line number, the first pixel number, and the common reference time;
holding, using the hardware processor, the first IP video packet during the first buffering interval; and
releasing, using the hardware processor, the first IP video packet when the first buffering interval elapses so as to align the first video content with the second video content at the common reference time;
wherein the common reference time is one of a first time the first IP video packet is received and a second time the second IP video packet is received.

11. The method of claim 10, wherein synchronizing the first IP video packet with the second IP video packet includes temporally aligning the first video content with the second video content based on the first frame number of the first video content and a second frame number of the second video content.

12. The method of claim 10, wherein synchronizing the first IP video packet with the second IP video packet includes vertically aligning the first video content with the second video content based on the first line number of the first video content and a second line number of the second video content.

13. The method of claim 10, wherein synchronizing the first IP video packet with the second IP video packet includes horizontally aligning the first video content with the second video content based on the first pixel number of the first video content and a second pixel number of the second video content.

14. The method of claim 10, further comprising determining, using the hardware processor, a second buffering interval for synchronizing the second IP video packet with the first IP video packet, the second buffering interval being determined based on a second frame number of the second IP video packet, a second line number of the second IP video packet, a second pixel number of the second IP video packet, and the common reference time.

15. The method of claim 14, further comprising holding, using the hardware processor, the second IP video packet during the second buffering interval.

16. The method of claim 15, further comprising releasing, using the hardware processor, the second IP video packet when the second buffering interval elapses.

17. The method of claim 10, wherein the first frame number, the first line number, and the first pixel number are included in a header of a first frame of the first IP video packet, and a second frame number, a second line number, and a second pixel number are included in a header of a second frame of the second IP video packet.

18. The method of claim 10, wherein the common reference time is the second time the second IP video packet is received.

* * * * *